United States Patent
Sasano et al.

(10) Patent No.: US 7,334,654 B2
(45) Date of Patent: Feb. 26, 2008

(54) VEHICLE FRONT END STRUCTURE

(75) Inventors: Norihisa Sasano, Ama-gun (JP); Toshiki Sugiyama, Kariya (JP)

(73) Assignee: DENSO Corporation, Kariya (JP)

( * ) Notice: Subject to any disclaimer, the term of this patent is extended or adjusted under 35 U.S.C. 154(b) by 78 days.

(21) Appl. No.: 10/643,716

(22) Filed: Aug. 19, 2003

(65) Prior Publication Data

US 2004/0163864 A1  Aug. 26, 2004

(30) Foreign Application Priority Data

Aug. 22, 2002  (JP) ............................. 2002-242054

(51) Int. Cl.
  *B60K 11/08* (2006.01)
(52) U.S. Cl. .................... 180/68.1; 180/68.3; 180/68.4
(58) Field of Classification Search ............... 180/68.1, 180/68.2, 68.3, 68.4, 68.6
  See application file for complete search history.

(56) References Cited

U.S. PATENT DOCUMENTS

| | | | |
|---|---|---|---|
| 4,610,326 A * | 9/1986 | Kirchweger et al. | 180/68.1 |
| 4,702,079 A * | 10/1987 | Saito et al. | 60/599 |
| 4,744,411 A * | 5/1988 | Lohmann | 165/41 |
| 4,831,981 A * | 5/1989 | Kitano | 123/198 E |
| 5,058,558 A * | 10/1991 | Ueda et al. | 123/559.1 |
| 5,358,304 A * | 10/1994 | Kanemitsu et al. | 296/193.09 |
| 5,427,502 A * | 6/1995 | Hudson | 415/211.1 |
| 5,448,982 A * | 9/1995 | Arakawa et al. | 123/559.1 |
| 5,551,505 A * | 9/1996 | Freeland | 165/41 |
| 5,711,387 A * | 1/1998 | Murata et al. | 180/68.1 |
| 6,035,955 A * | 3/2000 | Suzuki et al. | 180/68.1 |
| 6,357,541 B1 * | 3/2002 | Matsuda et al. | 180/68.2 |
| 6,386,273 B1 * | 5/2002 | Hateley | 165/67 |

FOREIGN PATENT DOCUMENTS

| | | |
|---|---|---|
| JP | 64-16922 | 1/1989 |
| JP | 02-264115 | 10/1990 |
| JP | 5-87000 | 4/1993 |
| JP | 07-047845 | 2/1995 |
| JP | 09-060561 | 3/1997 |
| JP | 9-60561 | 3/1997 |
| JP | 11-157347 | 6/1999 |
| JP | 2000-337220 | 12/2000 |

OTHER PUBLICATIONS

Notice of Reasons For Rejection dated Feb. 16, 2007 in Japanese Application No. 2002-242054 with English translation.

* cited by examiner

*Primary Examiner*—Christopher P. Ellis
*Assistant Examiner*—Brian Swenson
(74) *Attorney, Agent, or Firm*—Harness, Dickey & Pierce, PLC

(57) ABSTRACT

An inlet 51 is disposed at a position which is on an upper side relative to an axial flow fan 60 and is opposite to a direction of air flow produced by the rotation of the axial flow fan 60, whereas an intercooler 30 is disposed at a position which is on a lower side relative to the axial flow fan 60 and is downstream along the direction of air flow produced by the rotation of the axial flow fan 60, whereby it can be prevented that an air cleaner 50 constitutes a resistance to an air flow to thereby reduce the volume of air which passes through the intercooler 30. Consequently, intake air can be sufficiently cooled to thereby increase the output of an engine 40.

7 Claims, 3 Drawing Sheets

VEHICLE FRONT END STRUCTURE

TECHNICAL FIELD

The present invention relates to a vehicle front end structure.

BACKGROUND ART

If an air cleaner is disposed downstream of an air-cooled type intercooler, as viewed in a direction of an air flow, the air cleaner constitutes a resistance to the air flow, and the volume of air passing through the intercooler is reduced, resulting in a drawback that intake air cannot be cooled sufficiently.

Note that the intercooler is an apparatus for cooling air drawn into an engine (an internal combustion engine), that is, intake air, and is used together with, in particular, a turbocharged engine.

DISCLOSURE OF THE INVENTION

The present invention was made in view of the aforesaid situation and a primary object of the invention is to provide a novel vehicle front end structure which is different from conventional vehicle front end structures, and a secondary object thereof is to prevent a reduction in volume of air passing through the intercooler.

With a view to attaining the objects, according to the present invention, there is provided a vehicle front end structure comprising an axial flow fan (60) having a rotating shaft which extends in a longitudinal direction of a vehicle and adapted to supply cooling air to a radiator (20), an intercooler (30) for cooling air drawn into an internal combustion engine (40) and an air cleaner (50), provided on a downstream side of an air flow relative to an inlet duct (51) from which air drawn into the internal combustion engine (40) is introduced, for removing dust in the air so introduced, wherein the inlet duct (51) is positioned opposite to the intercooler (30) across the axial flow fan (60) as viewed in the longitudinal direction of the vehicle, wherein the air cleaner (50) is positioned at a location where the air cleaner (50) deviates from the intercooler (30) as viewed in the longitudinal direction of the vehicle, and wherein the axial flow fan (60) rotates in a direction which deflects an air flow blown out of the axial fan (60) to an intercooler (30) side.

Then, according to the present invention, as the inlet duct (51) is positioned opposite to the intercooler (30) across the axial flow fan (60) as viewed in the longitudinal direction of the vehicle and, furthermore, the air cleaner (50) is positioned at the location where the air cleaner (50) deviates from the intercooler (30) as viewed in the longitudinal direction of the vehicle, it is possible to prevent the occurrence of a problem that the air cleaner (50) constitutes a resistance to an air flow, whereby the volume of air passing through the intercooler (30) is reduced. Consequently, as the intake air can be sufficiently cooled, the output of the internal combustion engine (40) can be increased.

In addition, as the axial flow fan (60) rotates in the direction which deflects the air flow blown out of the axial flow fan (60) to the intercooler (30) side, the inlet duct (51) can be situated in an area where the temperature is relatively low. Consequently, as the intake air having a low temperature can be introduced, the output of the internal combustion engine (40) can be increased.

Additionally, according to the present invention, a bell-mouthed-like air guide portion (14) for guiding air in front of the vehicle to the intercooler (30) is provided on a radiator support (10) which supports the radiator (20).

As this construction allows much more cooling air to be introduced to the intercooler (30), the intake air can sufficiently be cooled.

Furthermore, according to the present invention, the radiator support (10) and the air guide portion (14) are molded integrally.

The present invention will become more apparant from the following description of the preferred embodiments and the accompanying drawings of the present invention.

BEST MODE FOR CARRYING OUT THE INVENTION

First Embodiment

Figure 1:
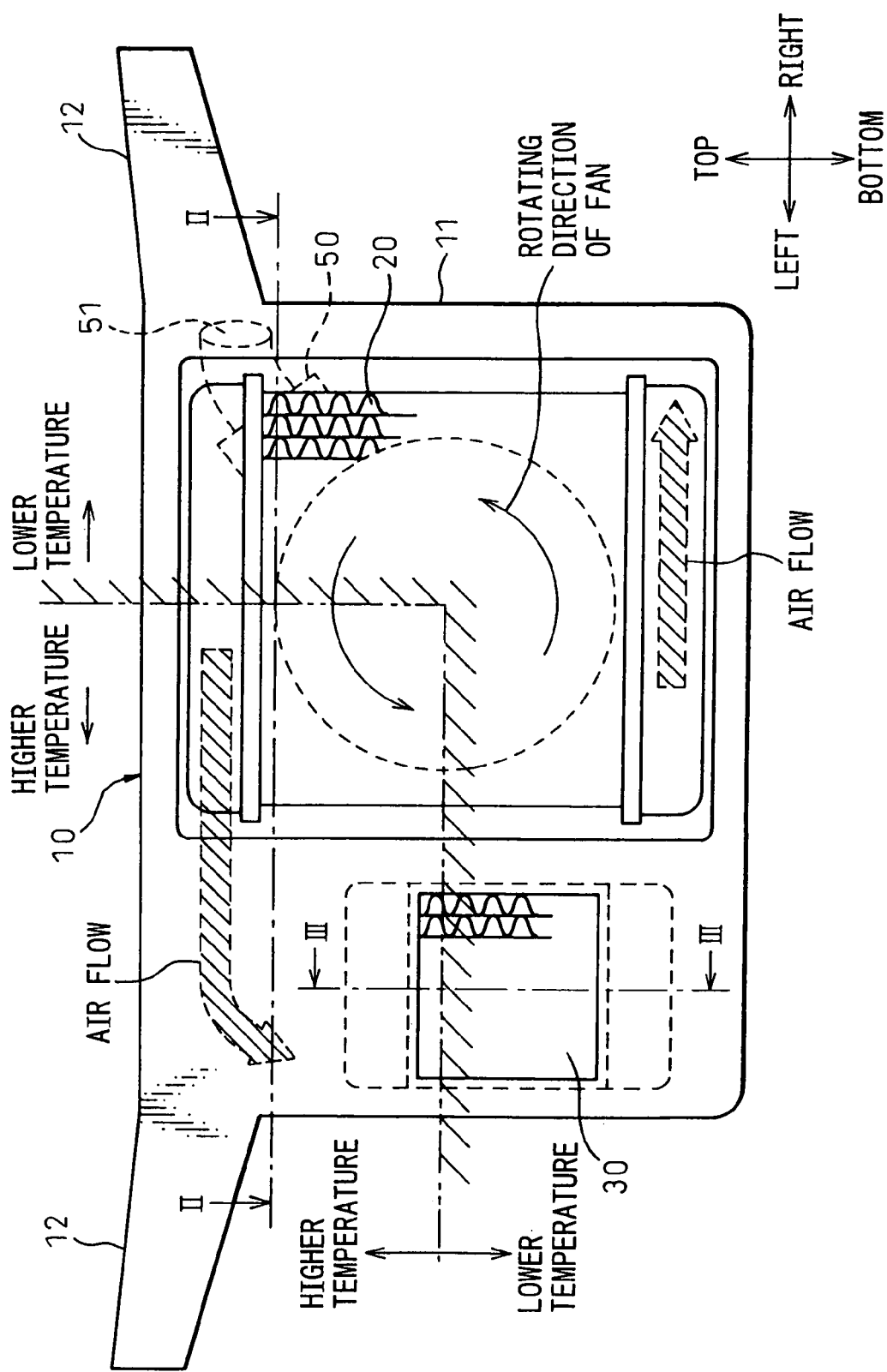
FIG. 1 is a front view of a vehicle front end structure according to a first embodiment of the present invention as viewed from a front side of a vehicle.
Figure 2:
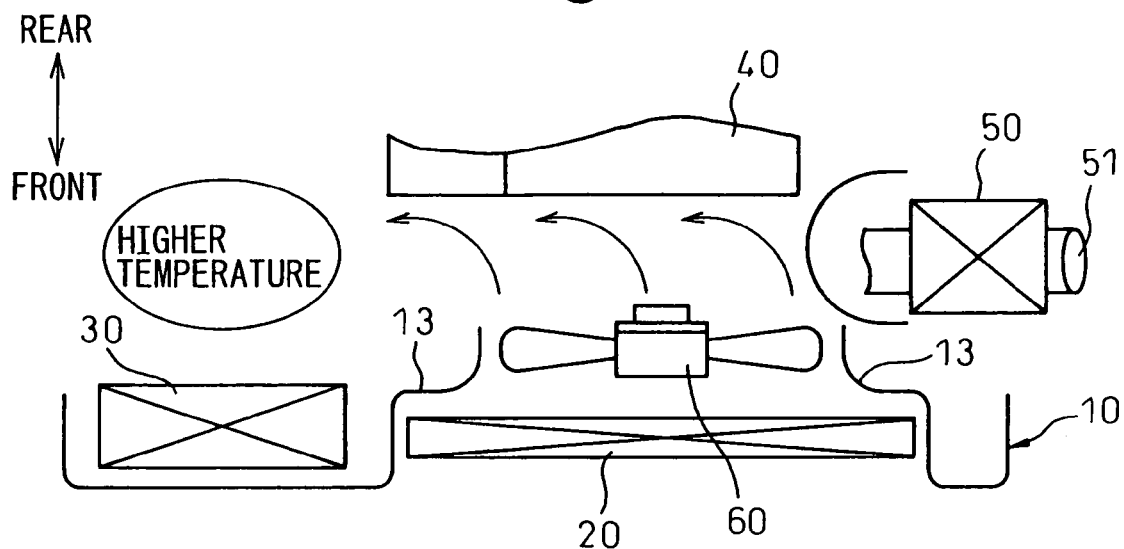
FIG. 2 is a sectional view taken along the line II-II in FIG. 1.
Figure 3:
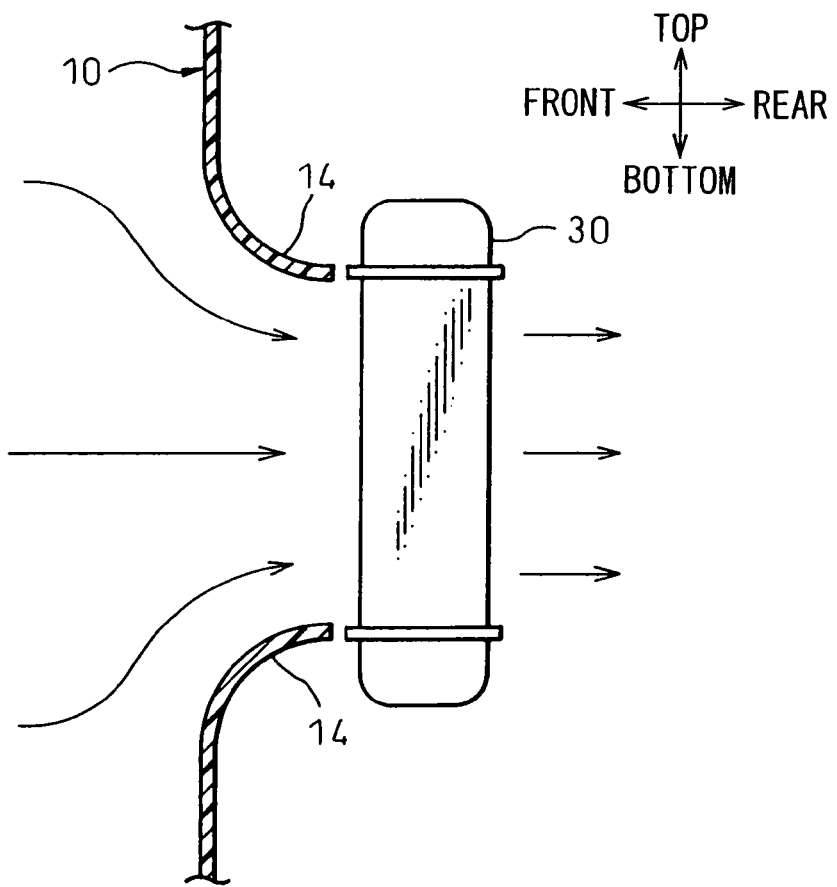
FIG. 3 is a sectional view taken along the line III-III in FIG. 1.

FIG. 1 is a front view of a vehicle front end structure according to a first embodiment of the present invention as viewed from a front side of a vehicle, FIG. 2 is a sectional view taken along the line II-II in FIG. 1, and FIG. 3 is a sectional view taken along the line III-III in FIG. 1.

As shown in FIG. 1, a radiator support 10 is constituted of a radiator support main body portion 11 to which a radiator 20 is assembled and fixed, and fixing portions 12 for fixing the radiator support main body portion 11 to a vehicle body, and the radiator support main body portion 11 and the fixing portions 12 are integrally molded from a resin whose mechanical strength is reinforced by reinforcing members such as carbon fibers and glass fibers.

Incidentally, the radiator support 10 is a member to which at least a heat exchanger such as the radiator 20 is assembled and is referred to as a carrier or a front end panel, depending on the literature, and the radiator 20 is a heat exchanger for cooling a coolant for an internal combustion engine for running, that is, an engine, through heat exchange taking place between the coolant and air.

As shown in FIG. 2, an intercooler 30 is an air-cooled type cooling apparatus for cooling air for combustion (hereinafter, referred to as intake air) which is drawn into an engine 40 installed rearward of the radiator support 10, and an air cleaner 50 is a filter box provided on a downstream side of an inlet duct 51 for taking in intake air from the atmosphere, as viewed in a direction of an air flow, for removing dust in the intake air so taken in. This air cleaner 50 is positioned at a location where it deviates from the intercooler 30 as viewed in a longitudinal direction of a vehicle. In addition, the intercooler 30 and the radiator 20 are disposed such that they are located in parallel at substantially the same position as viewed in the longitudinal direction of the vehicle.

In addition, a fan using an axial flow fan 60 for supplying cooling air to the radiator 20 is disposed rearward of the radiator 20, and the inlet duct 51 for taking in air drawn into the internal combustion engine 40 is positioned opposite to the intercooler 30 across the axial flow fan 60 when viewed in the longitudinal direction of the vehicle as shown in FIG. 1, thus the inlet 51 being opened at an opposite position to the intercooler 30. Namely, the inlet duct 51 is disposed at a position which is on an upper side relative to the axial flow fan 60 and is opposite to a direction of air flow produced by the rotation of the axial flow fan 60, whereas the intercooler 30 is disposed at a position which is on a lower side relative to the axial flow fan 60 and is downstream along the direction of air flow produced by the rotation of the axial flow fan 60. In addition, the axial flow fan 60 is disposed rearward of the radiator 20, and an obstacle such as the engine 40 which interrupts an air flow produced by the fan is disposed rearward of the axial flow fan 60.

Then, as shown in FIG. 2, the axial flow fan 60 is set to rotate in a direction which deflect an air flow blown out of the axial flow fan 60 to the intercooler 30. Namely, the axial flow fan 60 is set to rotate in a direction which allows the side where the intercooler 30 is disposed to constitute a front of the rotating direction thereof as viewed from a front of the vehicle.

Note that the axial flow fan 60 is a fan such as defined in No. 1012, JIS (Japanese Industrial Standard) B 0132 through which air passes in an axial direction thereof.

In addition, as shown in FIG. 2, a shroud portion 13 and a bell-mouthed-like air guide portion 14 (refer to FIG. 3) are integrally molded on the radiator support 10, the shroud portion 13 being constructed to cover gaps between the axial flow fan 60 and the radiator 20 so as to prevent an air flow induced by the axial flow fan 60 from flowing while bypassing the heat exchanger such as the radiator 20, and the air guide portion 14 being adapted for guiding air in front of the vehicle to the intercooler 30.

Note that, in this embodiment, the axial flow fan 60, that is, the fan is fixed to the radiator support 10 via the shroud portion 13, whereas the intercooler 30 is fixed to the radiator support 10 via the air guide portion 14.

Next, the function and advantage of the embodiment will be described.

As the air cleaner 50 is positioned at the location where it deviates from the intercooler 30 as viewed in the longitudinal direction of the vehicle, it can be prevented that the air cleaner 50 constitutes a resistance to the air flow to thereby reduce the volume of air passing through the intercooler 30. Consequently, as intake air can be sufficiently cooled, the output of the engine 40 can be increased.

Note that, in a case where the air cleaner 50 and the inlet 51 are disposed close to each other, in case where the inlet 51 is disposed opposite to the intercooler 30 across the axial flow fan 60, the air cleaner 50 can be prevented in an ensured fashion from constituting a resistance to an air flow which passes through the intercooler 30.

Incidentally, it has been made clear from tests and studies made by the inventors, et al that atmosphere temperatures in areas on a right-hand side of and below the chain double-dashed lines become lower than those in areas on a left-hand side of and above the chain double-dashed lines when the axial flow fan 60 rotates in a counterclockwise direction as shown in FIG. 1.

Consequently, as described in this embodiment, in the case, the axial flow fan 60 is set to rotate in the direction which deflects the air flow blown out of the axial flow fan 60 to the intercooler 30. That is, in case where the inlet duct 51 is disposed at the position which is on the upper side relative to the axial flow fan 60 and is opposite to the direction of air flow produced by the rotation of the axial flow fan 60, whereas the intercooler 30 is disposed at the position which is on the lower side relative to the axial flow fan 60 and is downstream along the direction of air flow produced by the rotation of the axial flow fan 60, as the construction allows the inlet duct 51 to be positioned in the areas on the right-hand side of and below the chain double-dashed lines, intake air having a low temperature can be taken in, whereby the output of the engine can be increased.

In addition, as the air guide portion 14 is provided for guiding air in front of the vehicle to the intercooler 30, more cooling air is introduced to the intercooler 30 and the intake air can be sufficiently cooled.

Second Embodiment

Figure 4:
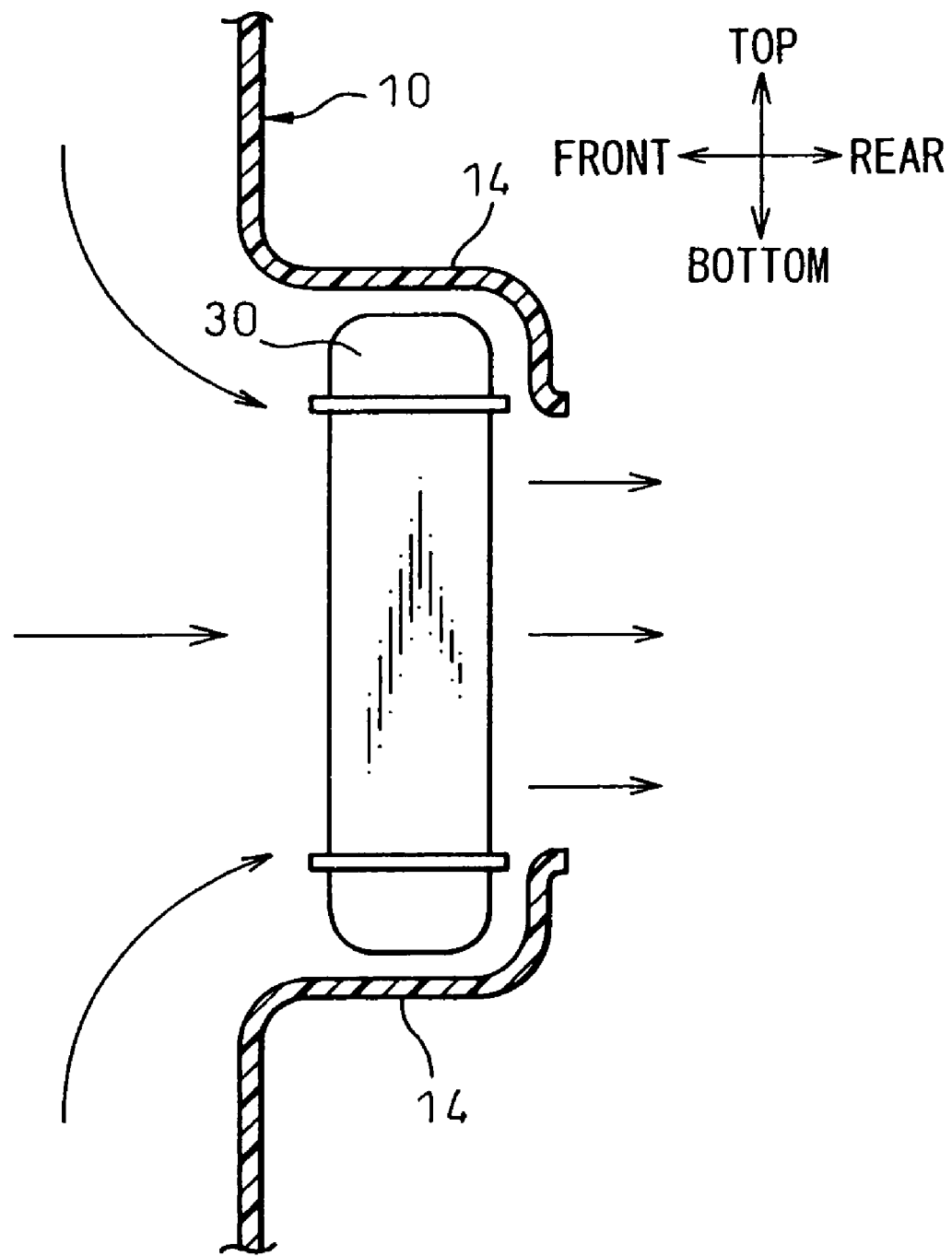
FIG. 4 is a drawing illustrating the characteristics of a vehicle front end structure according to a second embodiment of the present invention.

While, in the first embodiment, the air guide portion 14 is constructed to guide air only to a core portion of the intercooler 30, in a second embodiment, an air guide portion 14 is constructed to guide air to the entirety of the intercooler 30, as shown in FIG. 4.

Note that the core portion is a location through which cooling air passes and is also a location where positive heat exchange is performed between intake air and outside air.

Other Embodiments

While, in the aforesaid embodiments, the axial flow fan 60 is disposed downstream of the radiator 20 when viewed in the direction of air flow, in contrast to this, the axial flow fan 60 may be disposed upstream of the radiator 20 when viewed in the direction of air flow.

In addition, the installing position of the air cleaner 50 is not limited to the vicinity of the inlet 51 but may be located at any position where the inlet 51 can deviate from the intercooler 30 as viewed in the longitudinal direction of the vehicle.

Additionally, while, in the aforesaid embodiments, the radiator support 10 is made from the resin, the present invention is not limited to this, and the radiator support 10 may be made from metal such as aluminum, magnesium or iron.

Note that while the invention has been described in detail heretofore based on the specific embodiments, various changes and modifications that would be made by those skilled in the art can be made to the present invention without departing from the spirit and scope thereof.

The invention claimed is:

1. A vehicle front end structure comprising;
an axial flow fan having, in turn, a rotating shaft which extends in a longitudinal direction of a vehicle and adapted for supplying cooling air to a radiator,
an intercooler for cooling air drawn into an internal combustion engine, and
an air cleaner, provided on a downstream side of an air flow relative to an inlet of the air cleaner from which air drawn into the internal combustion engine is introduced, for removing dust in the air so introduced; wherein
the inlet of the air cleaner is positioned opposite to the intercooler across the axial flow fan as viewed in the longitudinal direction of the vehicle,
the air cleaner is positioned at a location where the air cleaner deviates from the intercooler as viewed in the longitudinal direction of the vehicle,
the axial flow fan rotates in a direction which deflects an air flow blown out of the axial fan to an intercooler side;

the inlet of the air cleaner is in communication with air at a location behind the radiator as viewed in the longitudinal direction of the vehicle; and the inlet of the air cleaner faces away from the internal combustion engine and draws the air from the location behind the radiator in a direction transverse to the longitudinal direction of the vehicle.

2. A vehicle front end structure as set forth in claim 1, wherein a bell-mouthed-like air guide portion for guiding air in front of the vehicle to the intercooler is provided on a radiator support which supports the radiator.

3. A vehicle front end structure as set forth in claim 2, wherein the radiator support and the air guide portion are integrally molded.

4. A vehicle front end structure as set forth in claim 1, wherein the intercooler and the radiator are disposed in parallel at substantially the same position in the longitudinal direction of the vehicle.

5. A vehicle front end structure as set forth in claim 1, wherein the axial flow fan is disposed rearward of the radiator, and wherein an obstacle, which interrupts an air flow produced by the axial flow fan, is disposed rearward of the axial flow fan.

6. A vehicle front end structure as set forth in claim 1, wherein the inlet of the air cleaner is made to open on an opposite side to the intercooler.

7. A vehicle front end structure as set forth in claim 1, wherein the axial flow fan rotates in a direction which allows a side where the intercooler is disposed to constitute a front of a rotating direction thereof as viewed from a front side of the vehicle.

* * * * *